UNITED STATES PATENT OFFICE 2,480,466

PRODUCTION OF PENICILLIN-G

Stanton A. Harris, Westfield, and Karl Folkers, Plainfield, N. J., assignors to Merck & Co., Inc., Rahway, N. J., a corporation of New Jersey No Drawing. Application March 23, 1946, Serial No. 656,772

14 Claims. (Cl. 260—302)

This invention relates to penicillin and more particularly to procedures by which penicillin G and other chemically related substances having penicillin activity can be prepared synthetically.

It has been established with reasonable certainty that penicillin G has the structural formula

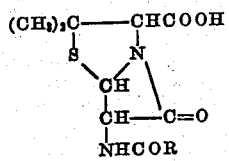

where R is the benzyl group ($-CH_2C_6H_5$). Other forms of penicillin are of similar structure, differing only in that the $CH_2C_6H_5$ (benzyl) group is replaced by other monovalent organic radicals, generally radicals having five or more carbon atoms. Both saturated and unsaturated hydrocarbon radicals, as well as substituted hydrocarbon radicals, at R in the above formula give products having penicillin activity.

It has now been discovered in accordance with the present invention that compounds having penicillin activity can be prepared synthetically by condensing α-amino-β-mercaptoisovaleric acid (penicillamine) with a 4-alkoxymethylene-5(4)-oxazolone having a suitable monovalent organic radical in the 2-position. This reaction as applied to the production of penicillin G is indicated graphically as follows:

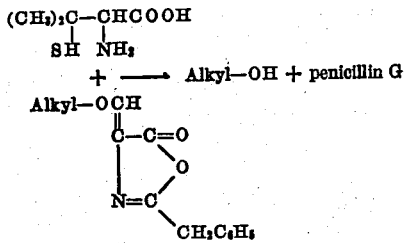

In this reaction, other products are formed including substantial amounts of penicillenic acid G which is believed to have the formula

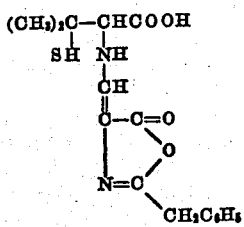

The formation of products devoid of penicillin activity is explained, at least in part, by the fact that each of the starting compounds employed in the reaction exists in a plurality of isomeric forms, and penicillin G itself has three asymmetric centers. Thus, for example, the d-isomer of penicillamine (which is the form in which this substance is derived from penicillin by degradation) is necessary in the foregoing reaction to yield a product having penicillin activity. The l-isomer produces no activity; and racemic dl-penicillamine produces only a small fraction of the activity that is produced by use of only the d-isomer.

d-Penicillamine is formed upon treatment of penicillin with dilute mineral acid and can also be prepared synthetically from dl-valine through a new intermediate 2-methyl-4-isopropylidene-5(4)-oxazolone and the racemic dl-penicillamine by a procedure fully disclosed in co-pending joint applications of one of us, Mozingo, Folkers, and Easton, Serial No. 656,511, filed March 22, 1946; Sheehan, Mozingo, Folkers, and Tishler, Serial No. 656,512, filed March 22, 1946 now Patent 2,477,148; and Sheehan and Tishler, Serial No. 656,513, filed March 22, 1946.

The other starting material, 2-benzyl-4-alkoxymethylene-5(4)-oxazolone can be prepared from the methyl ester of α-formyl-α-phenacetamidoacetic acid by procedures fully described in a co-pending joint application of two of us, Harris, Arth, Hoffman, and Folkers, Serial No. 636,516, filed December 21, 1945.

In carrying out the process of the present invention penicillamine, preferably in the form of the d-isomer, is condensed with a 2-benzyl-4-alkoxymethylene-5(4)-oxazolone in the presence of a nitrogenous liquid condensing agent such as pyridine, acetamide and the like. It is preferable to employ a large excess of the condensing agent which also acts as a solvent. The condensation proceeds very slowly at about room temperature, but much faster at elevated temperatures of the order of 75 to 110° C. In the condensation, time is an inverse function of the temperature employed and suitable conditions of time and temperature appear to be two to three hours at about 75° C., about one hour at 100° C., and about fifteen minutes at 110° C. It should be noted that prolonged heating above 100° C. results in destruction of part of the activity.

It has also been found that the presence of catalytic amounts of materials such as ascaridol or benzoyl peroxide in the condensation have no deleterious effect and may be slightly beneficial.

When the condensation is complete, the solvent or condensing agent is removed, preferably by distillation under vacuum; final drying being effected by heating to about 60° C. while evacuating to about 1 mm. of mercury pressure. The product thus obtained is a mixture of active material (penicillin G) and inactive by-products. This mixture can be fractionated by treatment with suitable solvents such as ether, ethyl acetate, and the like. Ethyl acetate removes substantially all of the activity, leaving an insoluble and inactive residue. The activity can be further concentrated by treating the ethyl acetate solution with an adsorbent material such as acid-washed alumina, and eluting therefrom fractions of different activity. When this is done in a chromatographic-type column, a colored band forms and the active material reaches highest concentration in the lower portion of the band.

It will be understood that, while the foregoing description has been directed to the preparation of penicillin G, other forms of penicillin can be prepared in like manner by employing in the condensation a 4-alkoxymethylene-5(4)-oxazolone having a suitable monovalent organic radical in the 2-position.

The following examples are representative of the procedures embodied in the present invention, but it is to be understood that these examples are given by way of illustration and not of limitation.

Example I

A solution of 1 g. of d-penicillamine hydrochloride plus 1.3 g. of 2-benzyl-4-methoxymethylene-5(4)-oxazolone in 100 cc. of pyridine was heated at 75° for one hour. The pyridine was removed under reduced pressure and the product was dissolved in chloroform and washed with ice-cold dilute hydrochloric acid, finally with water and dried. On removal of the chloroform under reduced pressure, a yellowish fluffy solid was obtained. The in vitro assay showed about 1.5 U/mg. This product was dissolved in boiling benzene (200–250 cc.) and allowed to stand for 16 hours. A granular precipitate separated that melted over a wide range, 110–170°, and was mostly insoluble in benzene, chloroform, and ethylene dibromide. The activity had dropped to about 0.28 U/mg. Its lack of solubility in the solvents named above precluded a molecular weight determination. The neutral equivalent was about 247. Ultra-violet absorption spectra showed a single band at 3200 Å with an $E_M$ of about 5000 based on 334 for the molecular weight. There was also end absorption in the lower wave lengths. The solubility would indicate that the product was not mono-molecular. The analysis agreed with the theoretical for a combination of one mole of penicillamine with one mole of 2-benzyl-4-methoxymethylene-5(4)-ozazolone with the loss of one mole of methyl alcohol.

Analysis: Calculated for $C_{16}H_{18}N_2O_4S$: C, 57.47; H, 5.42; N, 8.38; S, 9.59.

Found: C, 57.71; H, 5.39; N, 7.99; S, 9.55.

The benzene-soluble fraction was low in sulfur and had about 0.25 U/mg. activity.

Example II

About 1 g. of d-α-amino-β-mercapto-isovaleric acid (d-penicillamine) was heated with about 1.3 g. of 2-benzyl-4-methoxymethylene-5(4)-oxazolone in 100 cc. of pyridine at 75° C. for one hour. The pyridine was then evaporated under reduced pressure, yielding a solid residue having an activity of about 1 U/mg.

This residue was dissolved in ethyl acetate and passed over a column of acid-washed alumina. A colored band formed in the column and was gradually washed down the column with ethyl acetate. As the colored band was washed from the column a number of fractions of eluate were collected and worked up by extracting with a phosphate buffer of about pH 7, acidifying with hydrochloric acid, extracting the acid solution with ether, extracting the ether solution with water plus enough alkali (NaOH) to give a neutral solution, and freeze-drying the neutral aqueous solution. The solid product obtained has an activity of about 3.6 U/mg.

In the procedures described in Examples I and II, it should be noted that a large volume of pyridine has been used. If this volume is cut to one-tenth, the activity of the condensation product falls off about twenty-fold. This is apparently due, at least in part, to the fact that great dilution favors the formation of active material due to an intramolecular reaction. Solution takes about 10 to 15 minutes with heating (to about 75° C.) and very much longer at room temperature. The heating of the condensation mixture is therefore essential.

Example III

About 10 mg. of d-α-amino-β-mercapto-isovaleric acid and about 14 mg. of 2-benzyl-4-methoxymethylene-5(4)-oxazolone in 2 cc. of pyridine was heated at 75° C. for one hour and the pyridine was then evaporated under reduced pressure, and finally at about 1 mm. while heating to about 60° C. The dry product thus obtained had an activity of about 1 U/mg.

This condensation was repeated using in the condensation mixture catalytic amounts (about 5% by weight based upon pyridine) of ascaridol and benzoyl peroxide. The product obtained when ascaridol was added had an activity of about 1 U/mg.; and the product obtained when benzoyl peroxide was added had an activity of about 1.5 U/mg.

Example IV

A number of condensations were conducted using about 10 mg. of d-α-amino-β-mercapto-isovaleric acid plus about 14 mg. of 2-benzyl-4-methoxymethylene-5(4)-oxazolone in about 2 cc. of pyridine, using different conditions of time and temperature. The effect of these variations in time and temperature, as measured by the activity of the condensation products, is indicated by the following table:

Table

| Temperature | Time | Assay U/mg. |
| --- | --- | --- |
| 25° C | 16 hours | 0.15 |
| 25° C | 3–15 days | 0.5 |
| 75° C | 15 min | 0.7 |
| 75° C | 1 hour | 1.0 |
| 75° C | 3 hours | 1.5 |
| 105° C | ½ hour | 1.5 |
| 105° C | 1 hour | 0.8 |
| 105° C | 2 hours | 0.1 |
| 105° C | 4 hours | |
| 110° C | 15 min | 2.3 |
| 110° C | 1 hour | 1.0 |

Example V

About 1.13 g. of 2-benzyl-4-ethoxymethylene-5(4)-oxazolone and 0.773 g. of d-α-amino-β-mercaptoisovaleric acid in 50 cc. of dry pyridine were heated at 75° C. for about fifteen minutes. A portion of the resulting solution of condensation products was concentrated to dryness, and assay of the dried material indicated a penicillin activity in the solution of .38 unit per cc.

When dl-penicillamine is used as a starting material in the procedure above described in place of d-penicillamine, the activity produced is only about one-tenth as great, other conditions being the same. When l-penicillamine is used, no activity is obtained.

The activity obtained in the condensation products is a measure of the penicillin G formed in the condensation as evidenced by the behavior of these condensation products when subjected to characteristic tests. Thus, the activity is destroyed by addition of hydrogen sulfide or benzoyl chloride, but it is not affected by hydroquinone, phthalic anhydride, phenyl isocyanate, and silver gel.

In the foregoing examples all activities have been based upon in vitro assays. Corresponding in vivo assays are considerably higher. Thus, a product having an in vitro activity of 1 unit per mg. has an in vivo activity of about 10 units per mg.

Modifications may be made in carrying out the present invention without departing from the spirit and scope thereof, and our invention is to be limited only by the appended claims.

We claim:

1. The process for producing penicillin G that comprises condensing a substance of the class consisting of d-penicillamine and its hydrochloride with 2-benzyl-4-alkoxymethylene-5(4)-oxazolone by heating in pyridine solution, and recovering the penicillin G thus formed.

2. The process for producing penicillin G that comprises condensing a substance of the class consisting of d-penicillamine and its hydrochloride with 2-benzyl-4-alkoxymethylene-5(4)-oxazolone by heating in pyridine solution under conditions defined by the range 15 minutes at about 110° C. to 2-3 hours at about 75° C., and recovering the penicillin G thus formed.

3. The process for producing penicillin G that comprises condensing a substance of the class consisting of d-penicillamine and its hydrochloride with 2-benzyl-4-alkoxymethylene-5(4)-oxazolone by heating in pyridine solution, evaporating the reaction mixture under reduced pressure, extracting the dry residue thus obtained with a solvent of the class consisting of ether and ethyl acetate, and recovering penicillin G from the solvent extract.

4. The process for producing penicillin G that comprises condensing a substance of the class consisting of d-penicillamine and its hydrochloride with 2-benzyl-4-alkoxymethylene-5(4)-oxazolone by heating in pyridine solution, evaporating the reaction mixture under reduced pressure, extracting the dry residue thus obtained with a solvent of the class consisting of ether and ethyl acetate, and recovering penicillin G from the solvent extract by treating the extract with an adsorbent material and fractionally eluting the adsorbate therefrom.

5. The process for producing penicillin G that comprises condensing a substance of the class consisting of d-penicillamine and its hydrochloride with 2-benzyl-4-alkoxymethylene-5(4)-oxazolone by heating in pyridine solution and in the presence of a catalytic amount of benzoyl peroxide, and recovering the penicillin G thus formed.

6. The process for preparing penicillin G that comprises condensing d-penicillamine with 2-benzyl-4-methoxymethylene-5(4)-oxazolone by heating in pyridine solution, and recovering the penicillin G thus formed.

7. The process for preparing penicillin G that comprises condensing d-penicillamine with 2-benzyl-4-methoxymethylene-5(4)-oxazolone by heating in pyridine solution in the presence of a catalytic amount of benzoyl peroxide, and recovering the penicillin G thus formed.

8. The process for preparing penicillin G that comprises reacting d-penicillamine with 2-benzyl-4-methoxymethylene-5(4)-oxazolone in pyridine solution for a time and at a temperature defined by the limits of about 15 minutes at about 110° C. and about 2 to 3 hours at about 75° C., and recovering the penicillin G thus formed.

9. The process for preparing penicillin G that comprises condensing d-penicillamine with 2-benzyl-4-methoxymethylene-5(4)-oxazolone by heating in pyridine solution, evaporating the reaction mixture under reduced pressure, extracting the dry residue thus obtained with a solvent of the class consisting of ether and ethyl acetate, and recovering penicillin G from the solvent extract.

10. The process for preparing penicillin G that comprises condensing d-penicillamine with 2-benzyl-4-methoxymethylene-5(4)-oxazolone by heating in pyridine solution, evaporating the reaction mixture under reduced pressure, extracting the dry residue thus obtained with a solvent of the class consisting of ether and ethyl acetate, and recovering the penicillin G from the solvent extract by treating the extract with an adsorbent material and fractionally eluting the adsorbate therefrom.

11. The process for preparing penicillin G that comprises reacting d-penicillamine with 2-benzyl-4-methoxymethylene-5(4)-oxazolone in pyridine for about 15 minutes at about 110° C. and recovering the penicillin G thus formed.

12. The process for preparing penicillin G that comprises reacting d-penicillamine with 2-benzyl-4-methoxymethylene-5(4)-oxazolone in pyridine for about 2 to 3 hours at about 75° C., and recovering the penicillin G thus formed.

13. The process for preparing penicillin G that comprises condensing a substance of the class consisting of d-penicillamine and its hydrochloride with 2-benzyl-4-methoxymethylene-5(4)-oxazolone by heating in pyridine solution, and recovering the penicillin G thus formed.

14. The process for preparing penicillin G that comprises condensing d-penicillamine hydrochloride with 2-benzyl-4-methoxymethylene-5(4)-oxazolone by heating in pyridine solution, and recovering the penicillin G thus formed.

STANTON A. HARRIS.
KARL FOLKERS.

REFERENCES CITED

The following references are of record in the file of this patent:

Discovery Report, University of Michigan, BI, pp. 3, 7, 9, Feb. 16, 1944.

Progress Report, Synthesis of Penicillin, The Squibb Institute For Medical Research, July 1, 1944, S-22, page 9.

Experiments on the Synthesis of Penicillin and Allied Substances, July 10, 1944, U-XI, pages 8, 29, Upjohn Company.